(12) United States Patent
Brouwers et al.

(10) Patent No.: US 7,550,032 B2
(45) Date of Patent: Jun. 23, 2009

(54) METHOD FOR REMOVING CONTAMINATING GASEOUS COMPONENTS FROM A NATURAL GAS STREAM

(75) Inventors: Bert Brouwers, Eindhoven (NL); Michael Zvi Golombok, Rijswijk (NL); Ralph Van Wissen, Eindhoven (NL)

(73) Assignee: Shell Oil Company, Houston, TX (US)

( * ) Notice: Subject to any disclaimer, the term of this patent is extended or adjusted under 35 U.S.C. 154(b) by 576 days.

(21) Appl. No.: 11/355,620

(22) Filed: Feb. 16, 2006
(Under 37 CFR 1.47)

(65) Prior Publication Data
US 2006/0225386 A1   Oct. 12, 2006

(51) Int. Cl.
*B01D 45/12* (2006.01)

(52) U.S. Cl. .............. 95/141; 96/270; 55/400; 55/404

(58) Field of Classification Search ........... 55/400, 55/407, 408; 95/141, 260, 261, 270
See application file for complete search history.

(56) References Cited

U.S. PATENT DOCUMENTS

| | | | | |
|---|---|---|---|---|
| 3,775,988 | A | 12/1973 | Fekete | 62/23 |
| 4,182,480 | A | 1/1980 | Theyse et al. | 233/27 |
| 4,257,794 | A | 3/1981 | Shirokov et al. | 62/28 |
| 4,265,648 | A | 5/1981 | Wedege | 55/409 |
| 4,284,234 | A | 8/1981 | Rekant | 233/27 |
| 4,626,237 | A | 12/1986 | Galloway, Jr. | 494/37 |
| 4,994,097 | A | 2/1991 | Brouwers | 55/317 |
| 5,073,177 | A | 12/1991 | Brouwers | 55/317 |
| 5,133,190 | A | 7/1992 | Abdelmalek | 60/648 |
| 5,221,300 | A | 6/1993 | Hoogland et al. | 55/316 |
| 5,483,801 | A | 1/1996 | Craze | 62/5 |
| 5,565,180 | A | 10/1996 | Spink | 423/220 |
| 5,667,543 | A | 9/1997 | Brouwers | 55/317 |
| 5,902,224 | A | 5/1999 | Bloom | 494/25 |
| 6,592,654 | B2 * | 7/2003 | Brown | 95/270 |

FOREIGN PATENT DOCUMENTS

| | | |
|---|---|---|
| DE | 2850019 | 5/1980 |
| DE | 19621908 | 12/1997 |

(Continued)

OTHER PUBLICATIONS

"Phase separation in centrifugal fields with emphasis on the rotational particle separator" by J.J.H. Brouwers; Experimental Thermal and Fluid Science 26 (2002), pp. 325-334.

(Continued)

*Primary Examiner*—Robert A Hopkins
(74) *Attorney, Agent, or Firm*—William E. Hickman

(57) ABSTRACT

A method for removing contaminating gaseous components, such as $CO_2$ and/or $H_2S$, from a contaminated natural gas stream. The method includes the steps of expanding the contaminated gas stream in an expander to form an expanded gas stream; allowing at least part of the contaminants in the expanded gas stream to liquefy to form a dispersion of a contaminants enriched liquid phase in a contaminants depleted gaseous phase; and separating at least part of the contaminants enriched liquid phase from the contaminants depleted gaseous phase in one or more centrifugal separators.

29 Claims, 2 Drawing Sheets

FOREIGN PATENT DOCUMENTS

| | | |
|---|---|---|
| EP | 0286160 | 3/1988 |
| EP | 286160 | 5/1990 |
| EP | 0693958 B1 | 1/1998 |
| EP | 1017465 | 11/2002 |
| JP | 1135516 | 5/1989 |
| WO | WO9423823 | 10/1994 |
| WO | WO9744117 | 11/1997 |
| WO | WO2005118110 A1 | 12/2005 |
| WO | WO2006087332 A1 | 8/2006 |

OTHER PUBLICATIONS

European Search Report dated Jul. 29, 2005, Application No. 051011989.9

J. J. H. Brouwers. "Phase Separation in Centrifugal Fields with Emphasis on the Rotational Particle Separator", Experimental Thermal and Fluid Science. Elsevier. pp. 325-334, May 2001.

J. J. H. Brouwers. "Drilling & Production—Novel Centrifugal Process Removes Gas Contaminants", Oil & Gas Journal, pp. 37-41, Nov. 2006.

\* cited by examiner

METHOD FOR REMOVING CONTAMINATING GASEOUS COMPONENTS FROM A NATURAL GAS STREAM

FIELD OF THE INVENTION

The invention provides a method for removing contaminating gaseous components, such as carbon dioxide ($CO_2$) and hydrogen sulphide ($H_2S$), from a natural gas stream.

BACKGROUND OF THE INVENTION

Various processes are known to remove contaminating gaseous components from a natural gas stream. The processes may be based on physical and/or chemical separation techniques. The physical separation techniques use differences in boiling, condensation and/or freezing points of the various contaminating components to selectively remove one or more of these components in a fractionating column, or differences in density to separate components with different densities in a centrifugal or cyclonic separator. The chemical techniques may employ selective absorption or catalytic reactions to convert a contaminating component into a composition that can be easily separated.

The standard technique for removing hydrogen sulphide and carbon dioxide from natural gas is amine treatment, which is based on solvent absorption. In this process the contaminating components are bound on a molecule such as diethanol amine in an aqueous solution. The clean hydrocarbon gas is not absorbed and emerges in the product gas stream. The solution with the absorbed contaminant is recycled and heated by approximately 100° C. to drive off the gases, which then are collected in a waste stream. The major cost factors in this process are the energy requirement for waste gas regeneration, solvent losses and the fact that the waste gases are regenerated at near atmospheric pressure— any process such as reinjection requires compression.

The operating costs for any gas purification process need to be a relatively small fraction of the value of the clean gas produced. Amine plants with their extensive gas-liquid contacting schemes will be fairly large, expensive and uneconomic if the gas stream contains a large fraction of contaminants.

Known gas separation centrifuges rotate at about 50,000 revolutions per minute (RPM) to separate gaseous fractions with only minor differences in density. These fast rotating centrifuges are known as ultracentrifuges and have limited separation efficiency and can only handle a limited flux of gas. If a large natural gas stream containing a large fraction of contaminants is to be purified by means of centrifuges then a large amount of centrifuges or ultracentrifuges are required, which renders centrifugal separation uneconomical.

U.S. Pat. Nos. 4,994,097; 5,221,300 and 5,902,224 and the paper 'Phase separation in centrifugal fields with emphasis on the rotational particle separator' published by J. J. H. Brouwers in the magazine Experimental Thermal and Fluid Science 26 (2002), pages 325-334 disclose centrifuges for separating solid impurities from gas mixtures.

It is an object of the present invention to provide a method for removing contaminating gaseous components, such as carbon dioxide and/or hydrogen sulphide, from a natural gas stream in an efficient and economical manner, even if the natural gas comprises a large fraction of contaminating gaseous components.

SUMMARY OF THE INVENTION

The method according to the invention for removing contaminating gaseous components, such as $CO_2$ and/or $H_2S$, from a contaminated natural gas stream, comprises:
  expanding the contaminated gas stream in an expander to obtain an expanded gas stream;
  allowing at least part of the contaminants in the expanded gas stream to liquefy to form a dispersion of a contaminants enriched liquid phase in a contaminants depleted gaseous phase; and
  separating at least part of the contaminants enriched liquid phase from the contaminants depleted gaseous phase in a centrifugal separator, which comprises a bundle of parallel channels that are arranged within a spinning tube parallel to an axis of rotation of the spinning tube.

Optionally, the contaminants depleted gas stream is recompressed in a compressor. In case the expander is a turbine expander and the compressor is a turbine compressor, the turbine expander and the turbine compressor may comprise rotors that are mounted on a common shaft.

These and other features, advantages and embodiments of the method according to the invention are described in more detail in the accompanying claims, example, abstract and the following detailed description of a preferred embodiment in which reference is made to the accompanying drawings.

DETAILED DESCRIPTION OF PREFERRED EMBODIMENTS

The invention relates to the use of one or more channeled centrifugal separators 2,3 for the separation of contaminating gaseous components, such as $CO_2$ and/or $H_2S$, from a natural gas stream, that comprises methane ($CH_4$), ethane, propane, butane and/or condensates, in an efficient manner even if a large natural gas stream with a large fraction of contaminants (25-75% by weight) is to be purified.

Figure 1:
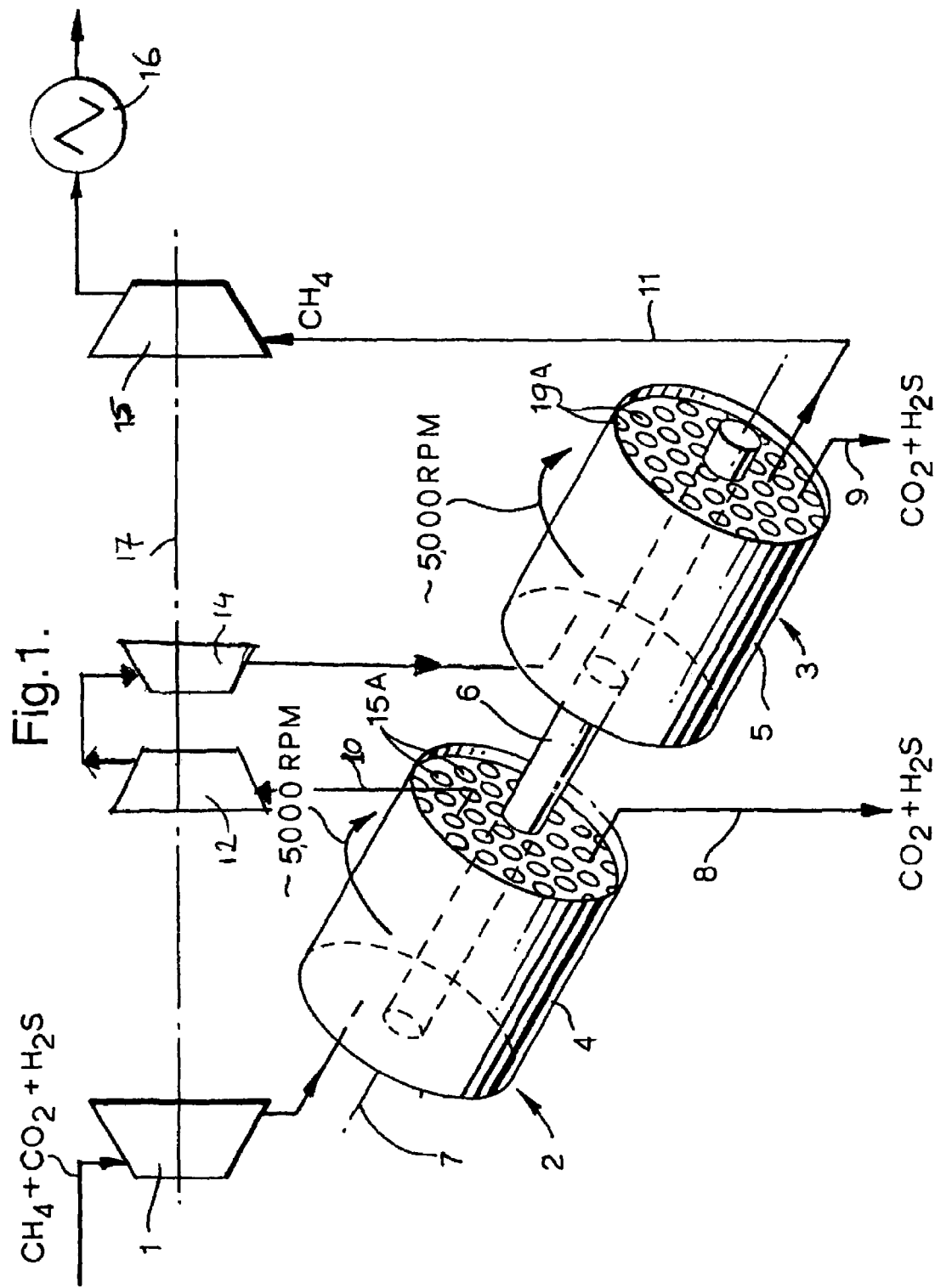
FIG. 1 illustrates a cooling and separation assembly comprising two channeled centrifugal separators in series for use in the method according to the invention.

FIG. 1 illustrates that in accordance with the invention the contaminated natural gas stream is cooled in a turbine expander 1 to obtain an expanded gas stream having a temperature and pressure at which the dewpointing conditions of the phases containing a preponderance of contaminating components, such as $CO_2$ and/or $H_2S$, are achieved. Instead of a turbine expander, any other type of expander may be used to expand the contaminated natural gas stream, for example a converging-diverging nozzle, a valve, an orifice or a porous plug.

The expanded gas stream from expander 1 is supplied to segmented centrifugal separator 2. The residence time of the expanded gas stream between the outlet of expander 1 and the inlet of separator 2 is such that at least part of the contaminants will liquefy by a combination of nucleation and coagulation. Thus, a dispersion of a contaminants-enriched liquid phase in a contaminants-depleted gaseous phase is formed upstream of centrifugal separator 2. Preferably, the residence time between expander and centrifugal separator is in the range of from 0.5 to 5 seconds, in order to allow for sufficient nucleation of the contaminants-enriched phase followed by sufficient coagulation of droplets to form droplets with a diameter in the micrometer range. The formation of the dispersion suitably takes place in an insulated conduit connecting expander 1 with centrifugal separator 2.

In centrifugal separator 2, at least part of the contaminants-enriched liquid phase is separated from the contaminants-depleted gaseous phase. Thus, a purified natural gas stream ($CH_4$) and a liquefied contaminants stream ($CO_2$ and/or $H_2S$) are obtained.

In the embodiment shown in FIG. 1, further contaminants are removed from the purified natural gas stream in a second segmented centrifugal separator 3.

FIG. 1 furthermore illustrates that each segmented centrifugal separator 2,3 comprises a spinning tube 4,5. The tubes 4,5 are mounted on a common shaft 6 that rotates about a central axis of rotation 7. Each centrifugal separator 2,3 comprises an outer liquefied contaminants outlet 8,9 and a central purified natural gas outlet 10,11. The outlets may be arranged near the downstream end and/or near the upstream end of each spinning tube 4,5. In the embodiment of FIG. 1, the outlets are near the downstream end of each spinning tube 4,5.

The central purified natural gas outlet 10 of the first centrifugal separator 2 feeds a stream of partially purified natural gas with a reduced $CO_2$ and/or $H_2S$ content via a recompression turbine 12, optionally an interstage cooler (not shown), and a turbine expander 14 into the inlet of the second centrifugal separator 3.

FIG. 1 also shows that a recompression turbine 15 and a cooler 16 are connected to the central purified natural gas outlet 11 of the second centrifugal separator 3 and that the expansion and recompression turbines 1, 12, 14 and 15 are mounted on a common shaft 17.

During normal operation the shaft 6 and tubes 4 and 5 of the first and second centrifugal separators 2 and 3 rotate about the central axis of rotation 7, typically at a rotation speed in the range of from 500 to 5,000 revolutions per minute (RPM), preferably of from 500 to 1,500 RPM. This speed is typically less than 10% of the speed of an ultracentrifuge. An electrical or other motor may rotate the shaft 6. Alternatively, the gas stream fed into the centrifugal separators 2 and 3 may be induced to swirl by one or more swirl imparting vanes, such that the swirling gas that enters the centrifugal separators 2 and 3 induces the separators 2 and 3 to rotate about the central axis of rotation 7 at the desired speed of rotation of in the range of from 500 to 5,000 RPM.

FIGS. 2 and 2A-2D illustrate in more detail the construction of the first centrifugal separator 2, which is identical to the construction of the second centrifugal separator 3.

Figure 2:
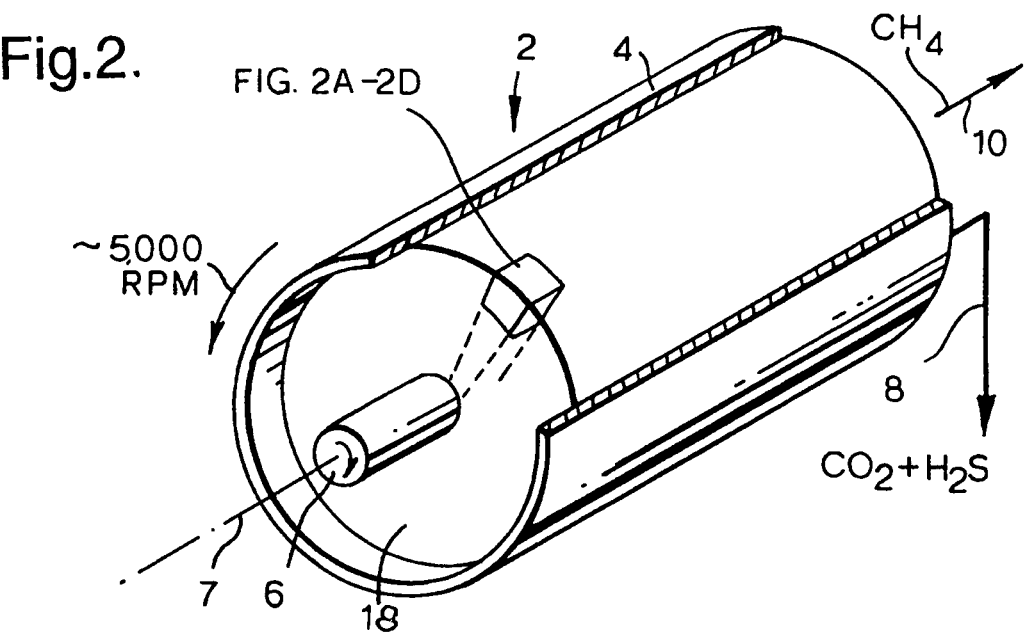
FIG. 2 illustrates at a larger scale one of the channeled centrifugal separators of FIG. 1.
Figure 2A:
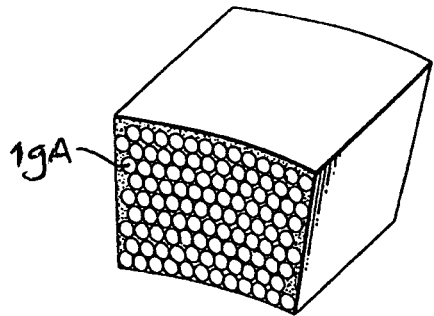
FIGS. 2A-2D illustrate various shapes of the channels in the separator of FIG. 2.
Figure 2B:
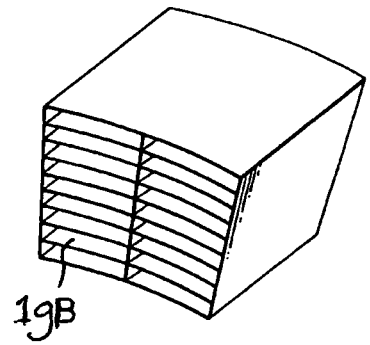
Figure 2C:
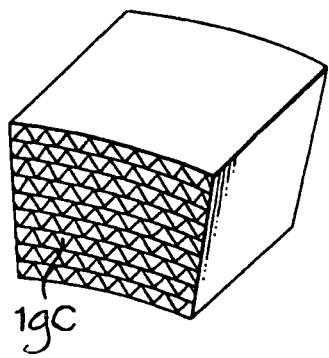
Figure 2D:
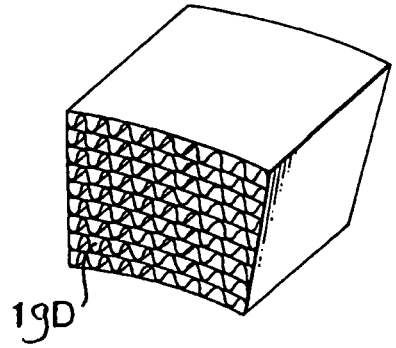

FIG. 2 shows schematically that an annular space 18 is present between central shaft 6 and the inner surface of the spinning tube 4. This annular space 18 is filled with an assembly of substantially axial flow channels 19 that may have various shapes that are shown in more detail in FIGS. 2A-2D.

FIGS. 2A-2D show at an enlarged scale the shaded segment A-D of FIG. 2 and illustrate that the flow channels 19A-19D may have a tubular, rectangular or corrugated shape and are arranged substantially co-axial to the axis of rotation 7 of the tube 4. The flow channels 19A-19D effectively decouple the axial turbulence associated with high throughput from the preserved radial laminarity. The width in radial direction of the channels 19A-19D is typically between 0.5 and 5 mm depending on flow conditions. The condensed nucleated waste is typically in the range 5-50% of the volume of the channels 19A-19D and is directed by the centrifugal force to the outer channel walls where a slower flowing film forms which can be collected radially from the downstream and the upstream end of the spinning tube 4 via the liquefied contaminants outlet 8 while the at least partly purified natural gas stream $CH_4$ is discharged via the central gas outlet 10 of the centrifugal separator 1 shown in FIG. 1.

Following the separation of liquefied contaminants $CO_2$ and/or $H_2S$ in the first centrifugal separator 2 according to the invention, the purified $CH_4$-enriched natural gas stream discharged via the central purified natural gas outlet 10 is further separated in the second centrifugal separator 3 in the manner as described with reference to FIG. 1. Optionally the purified natural gas stream discharged via the central outlet 11 of the second centrifugal separator 3 may be further treated (not shown) in a small scale amine treater, a selective absorption system, or a membrane separation system with associated additional deep cut purification processes to make the purified natural gas stream suitable for distribution or liquefaction in a LNG plant.

Alternatively for very contaminated natural gas streams, it is possible to use a third and optionally a fourth centrifugal separator (not shown) to purify the natural gas stream such that it has a sufficiently low $CO_2$ and/or $H_2S$ content.

Optionally, the condensed $CO_2$ and/or $H_2S$ streams discharged via the outer outlets 8 and 9 of the centrifugal separators 2 and 3 are collected and then heated (optionally by integration of the heater with the cooler 16) so that a re-pressurized waste gas stream with a large content of re-evaporated $CO_2$ and/or $H_2S$ is available for re-injection into a subsurface formation, such as the gas bearing reservoir formation, thus saving on compressor requirements.

It is observed that the liquefied contaminants in the channels 19A-19D may contain a small fraction of natural gas ($CH_4$). Complementarily, some $CO_2$ necessarily ends up in the purified natural gas stream in the central outlet 11.

Computer calculations indicate that a single stage centrifugal separator 2 assembly according to the invention shown in FIGS. 1 and 2 is able to purify a natural gas stream in the range from 1 to 30 Million Standard Cubic Meters per Day, which contains about 15-40% by weight of contaminants, such as $CO_2$ and/or $H_2S$, such that the purified gas stream contains less than 10% by weight of contaminants.

These computer calculations also indicate that a similar natural gas stream containing about 40-60% by weight of contaminants can be purified to a similar purity level by using a train of two centrifugal separators 2,3 as shown in FIG. 1 and that a natural gas stream which contains 60-75% of contaminants can be purified to a similar purity level by using a train of three centrifugal separators according to the invention.

Computer calculations also indicate that a conventional amine treater process could achieve a similar level of purification level at significant higher operating expenses (OPEX) than the centrifugal separator assembly according to the invention.

For example, the estimated energy costs of cleaning contaminated gas containing in the range of from 25 to 75% by weight of $CO_2$ and/or $H_2S$ by amine technology are prohibitive, ranging from 45%-200% of the produced clean gas value, whereas the estimated energy costs of the centrifugal separator assembly according to the invention are more than an order of magnitude below this at 0.5%-2% of the produced clean gas value.

Since $H_2S$ has a lower dewpoint pressure than $CO_2$, $H_2S$ can be separated easier with the centrifugal separator assembly according to the present invention than $CO_2$ from a contaminated natural gas stream.

It is surprising that the method according to the present invention is much more energy efficient than conventional amine treatment separation techniques and ultracentrifuge separation techniques in which gaseous phases with different densities are separated from each other.

It is observed that the method according to the invention may also be used to remove other contaminants than $CO_2$ and $H_2S$ from a natural gas stream. Such other contaminants may be water, solids, such as dust and sandy particles, and hydrocarbons other than methane, for example ethane, propane and butane.

EXAMPLES

The process according to the invention will be further illustrated by means of the following non-limiting example.

In a laboratory-scale experiment, a natural gas stream of 60 standard cubic metres per hour (80 kg/hr) comprising 50 wt % methane and 50 wt % carbon dioxide having a temperature of 303 K and a pressure of 150 bar was expanded with a Joule-Thomson expansion valve to a temperature of 226 K and a pressure of 27 bar. The expanded gas stream was then supplied, via an insulated conduit, to a centrifugal separator. The residence time in the insulated conduit was 1 second and small droplets of a liquid carbon dioxide-rich contaminant phase were formed in the conduit before the gas stream entered the separator.

The centrifugal separator was mounted vertically in a sealed housing. The height was 262 mm and the diameter 130 mm. The rotating element was machined from an integral cylinder of Duplex steel of length 250 mm and diameter 83 mm. For this relatively low gas throughput, a single annulus of channels on the rotating element was sufficient. However, for higher throughputs, the entire radial range of the rotating element is larger and will be completely used with a construction based on successive wrappings of corrugated thin layers of steel so that, when wound around an axis, a channeled filter-like structure results with dimensions similar to those described in this example.

On the surface of the cylinder, and parallel to the axis, a number of slotted channels were milled each of 2 mm height and 2 mm width with a centre-to-centre spacing of 5 mm. A hollow cylinder of similar material was machined to form a sleeve having the same axial length but an inner diameter of 83 mm and an outer diameter of 85 mm. This hollow cylinder was shrink-wrapped around the slotted cylinder by the following procedure: the channeled material was cooled to 243 K and the sleeve heated to 573 K. The latter was then placed over the former and the two were quenched in a water bath at room temperature.

The gas stream containing droplets of a liquid carbon dioxide-rich contaminant phase that was formed in the insulated conduit, was fed via a radial entry to the inlet of the housing and entered the separator which was rotated by use of a magnetic coupling system driven by an electric motor. The rotation rate was 500 RPM. Within the axial slotted channels, a liquid carbon dioxide-rich contaminant phase was formed on the walls. The droplets so generated were at least one order of magnitude larger than those in the inlet gas and were centrifugally spun out to exit channels on the walls where the collected liquid was discharged from the centrifuge to a waste collection vessel. Ingress of the gas was prevented by the use of liquid level seals on the outlets at the downstream and the upstream end of the rotating element. Both liquid outlets collected to a waste liquid collection vessel. Because the downstream outlet typically is at a lower pressure than the upstream outlet, the two outlet pipes cannot be joined to a single collection vessel as this would simply lead to liquid recirculation. Rather, the higher pressure liquid outlet was led via a siphon pipe, where the excess pressure over the lower pressure outlet was used to overcome a liquid column above the level in the collection vessel. As indicated, the lower pressure outlet was vented directly to the collection vessel.

A waste stream of 34 kg/hr comprising 90 wt % carbon dioxide and 10 wt % methane and a purified natural gas stream of 46 kg/hr comprising 67 wt % methane and 33 wt % carbon dioxide were recovered from the centrifugal separator. The recovery of methane was 95 wt %, based on the amount of methane in the input stream of natural gas.

The invention claimed is:

1. A method for removing contaminating gaseous components from a contaminated natural gas stream, the method comprising:
   expanding the contaminated gas stream in an expander to obtain an expanded gas stream;
   allowing at least part of the contaminants in the expanded gas stream to liquefy to form a dispersion of a contaminants enriched liquid phase in a contaminants depleted gaseous phase; and
   separating at least part of the contaminants enriched liquid phase from the contaminants depleted gaseous phase in a centrifugal separator which comprises a bundle of parallel channels that are arranged within a spinning tube parallel to an axis of rotation of the spinning tube; wherein the centrifugal separator is spun by introducing a swirling gas stream into the spinning tube.

2. The method according to claim 1, wherein the expander is a turbine expander.

3. The method according to claim 2, wherein the separated contaminants depleted gaseous phase is recompressed in a compressor.

4. The method according to claim 3, wherein the compressor is a turbine compressor.

5. The method according to claim 4, wherein the turbine compressor and the turbine expander comprise rotors that are mounted on a common shaft.

6. The method according to claim 1, wherein the separated contaminants depleted gaseous phase is recompressed in a compressor.

7. The method according to claim 1, wherein the contaminated natural gas stream contains from 15 wt % to 40 wt % contaminants.

8. The method according to claim 1, wherein the contaminated natural gas stream contains from 25 wt % to 75 wt % contaminants.

9. The method according to claim 1, wherein the separated contaminants depleted gaseous phase is discharged via a central fluid outlet of the centrifugal separator and supplied to a second centrifugal separator which also comprises a bundle of parallel channels that are arranged within a spinning tube substantially parallel to an axis of rotation of the spinning tube.

10. The method according to claim 9, wherein the expander is a turbine expander.

11. The method according to claim 10, wherein the separated contaminants depleted gaseous phase is recompressed in a compressor.

12. The method according to claim 11, wherein the compressor is a turbine compressor.

13. The method according to claim 11, wherein the turbine compressor and the turbine expander comprise rotors that are mounted on a common shaft.

14. The method according to claim 12, wherein the centrifugal separators are mounted on a common central shaft.

15. The method according to claim 14, wherein each centrifugal separator is spun by introducing a swirling gas stream into the spinning tube.

16. The method according to claim 9, wherein each centrifugal separator is spun by introducing a swirling gas stream into the spinning tube.

17. The method according to claim 9, wherein the centrifugal separators are mounted on a common central shaft.

18. The method according to claim 9, wherein the contaminated natural gas stream contains from 25 wt % to 75 wt % contaminants.

19. A method for removing contaminating gaseous components from a contaminated natural gas stream, the method comprising:
    expanding the contaminated gas stream in an expander to obtain an expanded gas stream;
    allowing at least part of the contaminants in the expanded gas stream to liquefy to form a dispersion of a contaminants enriched liquid phase in a contaminants depleted gaseous phase; and
    separating at least part of the contaminants enriched liquid phase from the contaminants depleted gaseous phase in a centrifugal separator which comprises a bundle of parallel channels that are arranged within a spinning tube parallel to an axis of rotation of the spinning tube;
    wherein the separated contaminants depleted gaseous phase is discharged via a central fluid outlet of the centrifugal separator and supplied to a second centrifugal separator which also comprises a bundle of parallel channels that are arranged within a spinning tube substantially parallel to an axis of rotation of the spinning tube.

20. The method according to claim 19, wherein the expander is a turbine expander.

21. The method according to claim 20, wherein the separated contaminants depleted gaseous phase is recompressed in a compressor.

22. The method according to claim 21, wherein the compressor is a turbine compressor.

23. The method according to claim 22, wherein the turbine compressor and the turbine expander comprise rotors that are mounted on a common shaft.

24. The method according to claim 19, wherein the separated contaminants depleted gaseous phase is recompressed in a compressor.

25. The method according to claim 19, wherein the centrifugal separator is spun by introducing a swirling gas stream into the spinning tube.

26. The method according to claim 19, wherein the contaminated natural gas stream contains from 15 wt % to 40 wt % contaminants.

27. The method according to claim 19, wherein the contaminated natural gas stream contains from 25 wt % to 75 wt % contaminants.

28. The method according to claim 19, wherein the centrifugal separators are mounted on a common central shaft.

29. The method according to claim 19, wherein each centrifugal separator is spun by introducing a swirling gas stream into the spinning tube.

* * * * *